Feb. 1, 1966     O. OECKL ETAL     3,232,142
APPARATUS FOR THE CONTROL OF MACHINE TOOLS
Filed Aug. 5, 1965     3 Sheets-Sheet 1

INVENTORS
Otto Oeckl
Richard Purschke

BY Bailey, Stephens and Huettig
ATTORNEYS

INVENTORS
*Otto Oeckl*
*Richard Purschke*

United States Patent Office 3,232,142
Patented Feb. 1, 1966

3,232,142
APPARATUS FOR THE CONTROL OF
MACHINE TOOLS
Otto Oeckl, and Richard Purschke, both of Munich,
Germany, assignors to Maschinenfabrik Augsburg-
Nurnberg A.G., Munich, Germany
Filed Aug. 5, 1965, Ser. No. 477,540
Claims priority, application Germany, Mar. 21, 1962,
M 52,197
2 Claims. (Cl. 77—32.2)

This is a continuation-in-part of application Serial No. 263,799 filed March 8, 1962, now abandoned, for "Apparatus for the Control of Machine Tools."

This invention relates to an apparatus for guiding and controlling a machine tool and, particularly, for controlling a machine tool from previously recorded information.

A numerical guidance and control of tooling machines is used in which a combination of numbers serves to outline the tool because of the impossibility of being able to copy or make large tools by tracing models or patterns, and also because of the necessity of reducing the set up time required, even when producing a small number of tools. This numerical control uses an information carrying device, preferably in the form of a punched card, or if this should not be sufficient, in the form of a punched tape or a magnetized tape. This information carrying device is accompanied by a sensor, such as an impulse scanner, which retrieves the information in the form of dots and passes it on in the form of controlling impulses to the tooling machine. The impulse scanner can have mechanical sensing or feeling pins which, in order to cause contact, fall through holes in the information carrying device, or the scanner can have magnetic sensing means, light sources, and the like.

It is preferred to have separate sensing elements for individual orders to the tool machine. For example, if, according to the orders or punched details on a punched card information carrying member, a workpiece is to be provided with several drill holes by a one-spindle drilling machine, then, after the drilling machine has been properly set up, one impulse is required to operate the drilling machine for the boring of the first hole and then stopping it to complete a working cycle. Then another impulse is needed to move the workpiece and drilling machine relative to each other so that they become positioned at the exact point determined for the next drill hole, which is the cycle of displacement or motion. For this cycle, it is also necessary to indicate the direction the workpiece and/or drilling machine is to be moved and at what velocity. Separate sensing devices must be used for the individual orders and care must be exercised by suitable means so that the individual sensing devices operate only in conjunction with the control points on the information carrying device, there being a separate sensing device for each control point.

The object of this invention is to provide simple means at low cost for ensuring that the individual sensing elements and their respective control points cooperate with each other.

In general, this invention is for a machine tool control apparatus having an information carrying member and an information sensing member which move relative to each other and in which these members are either spaced from each other or the sensing member has sensing elements which make contact through control point holes in the information carrying member for the purpose of delivering control commands to the machine tool.

According to this invention, the sensing elements on the sensing member and the control points on the information carrying member both lie on a line which bisects the angle between the two main directions of relative movements between the information carrying member and the sensing member.

The means by which the objects of the invention are obtained are described more fully with reference to the accompanying schematic drawings, in which.

Figure 1:
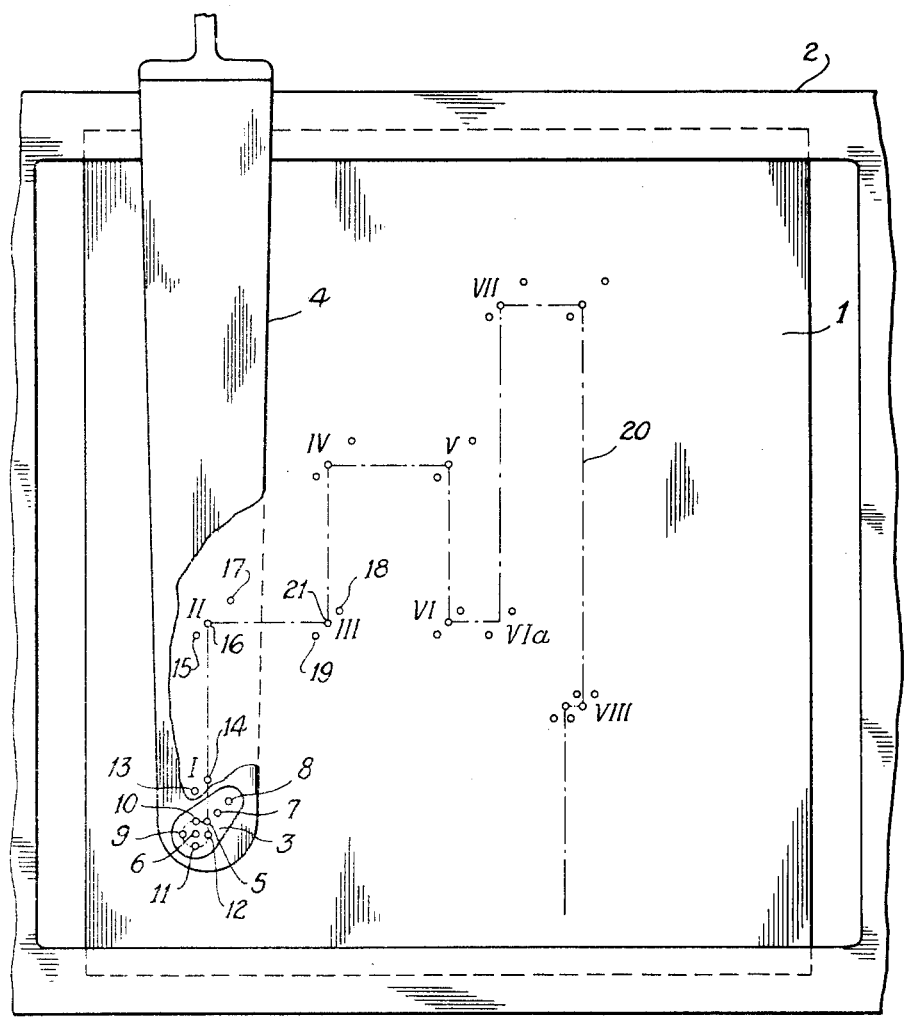
FIGURE 1 is a front view of the improvement of this invention.

As shown in FIGURE 1, the stencil 1, to wit, a punch card, having control point holes positioned according to the sequential working steps to be performed is inserted in a frame 2. Sensing member 3 is mounted on the end of a bifurcated device 4 between the arms of which extends frame 2 holding punch card 1. Device 4 and punch card 1 are movable relative to one another both horizontally and vertically as indicated in FIGURE 1. It makes no difference which is movable and which is fixed. The part of the sensing member 3 on one side of the punch card is, for example, provided with contact sensing elements such as pins under spring pressure of conventional form as, for example, shown in the U.S. Patent to Wurts, No. 1,241,269, and the part of the sensing member on the other side of the punch card is provided with fixed opposed electrical contacts. If the sensing elements on the opposite sides of the card 1 electrically contact one another, then a control command is given the machine tool such as a drilling machine, which is electrically connected to this circuit. Generally, four electric contact sensing elements 5, 6, 7 and 8 are provided which lie on the line bisecting the angle between the two main directions of movement of the sensing member 3 relative to the punch card 1, that is lengthwise and crosswise as shown in FIGURE 1, and which bisecting line is inclined not more than 45° with respect to the direction of movement.

Figure 3:
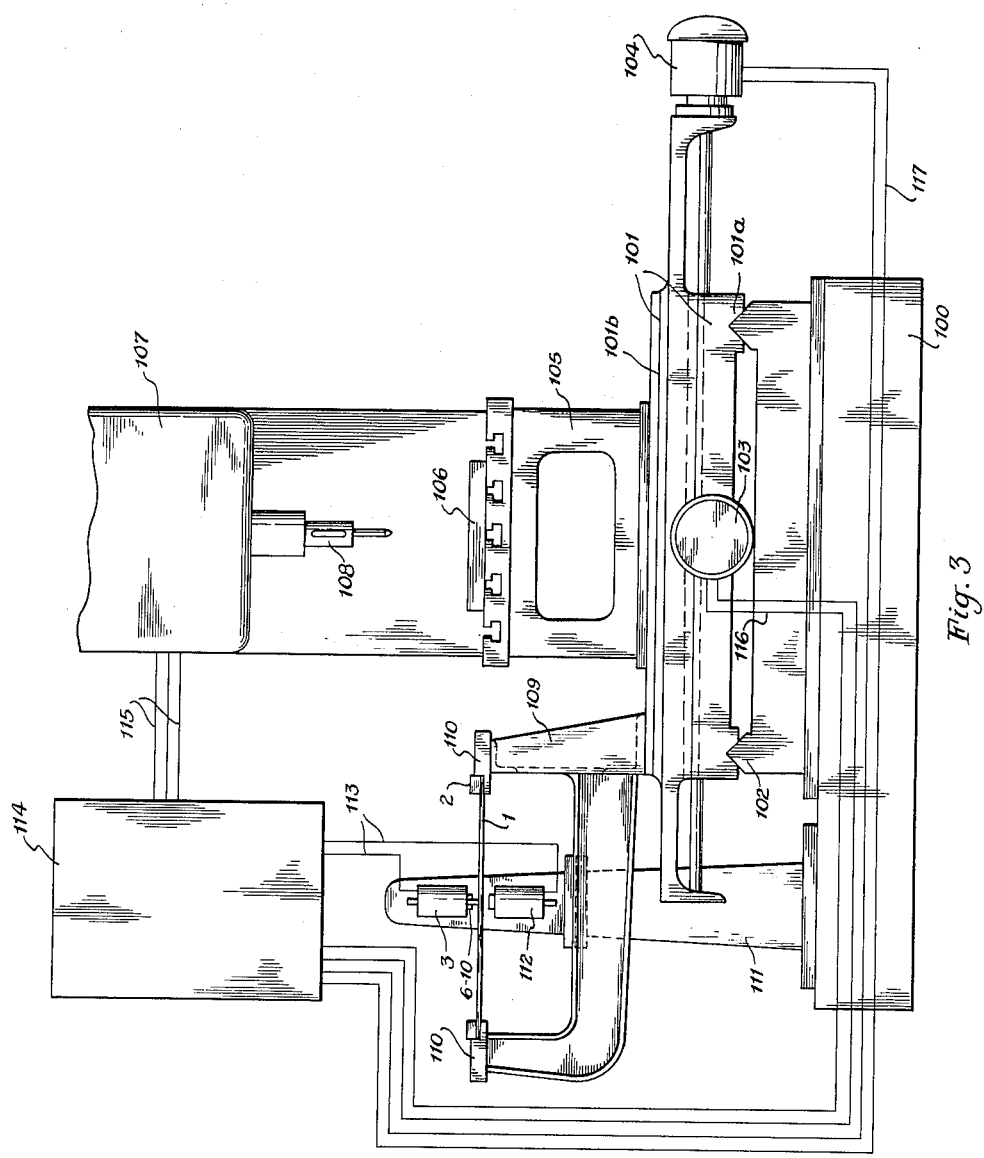
FIGURE 3 is a front elevational view of a drilling machine using this invention.
Figure 4:
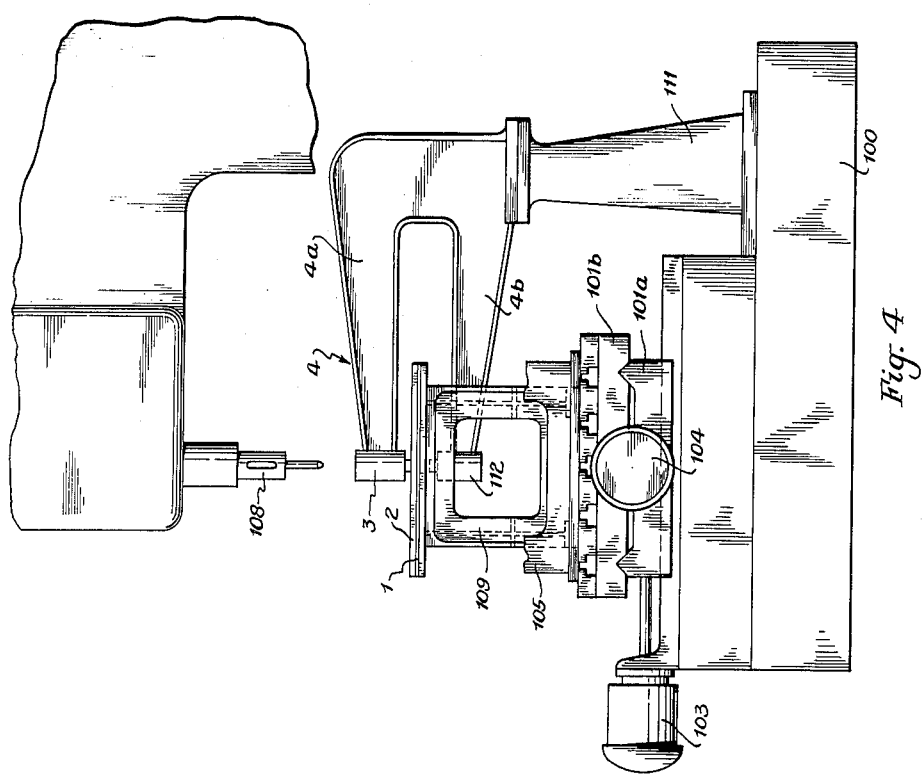
FIGURE 4 is a side view of FIGURE 3.

The punch card 1 is used for controlling a drilling machine, for example, such as is shown in FIGURES 3 and 4. This machine has a base 100 upon which is a table 101 movable in two directions at right angles to each other. The lower part 101a of the table is movable on rails transversely of the machine by means of the motor 103. The upper part 101b of the table is moved longitudinally by means of motor 104. Workpiece support 105 is fastened to upper table part 101b and carries the workpiece 106 in which holes are to be drilled. The drill head 107 includes the drill spindle 108. Mounted on upper table portion 101b alongside of the workpiece support 105 is the punch card carrying stand 109. The punch card 1 is clamped in the jaws 110 of stand 109.

A sensing member supporting stand 111 is fastened to the base 100 of the machine and carries the bifurcated device 4 composed of an upper arm 4a and a lower arm 4b. The sensing member 3 is carried on the free end of arm 4a which includes the electric sensing elements 5, 6, 7 and 8 as heretofore described. Lower arm 4b carries the electrical contact member 112. The sensing member 3 and electric contact member 112 are connected by electric lines 113 to control box 114 which is of conventional contruction and includes the customary relays and switches. The switches in control box 114 are connected by electric lines 115 to the motor controls in drill head 107 and further connected by electric lines 116 to motor 103 and by electric lines 117 to motor 104. It is evident that when motors 103 and 104 are energized that the lower and upper table portions 101a and 101b, respectively, will start to move and will, in turn, move the punch card 1 between the sensing member 3 and the contact member 112. In so moving, the pins 5, 6, 7 and 8 will fall through the holes in the punch card and establish an electric circuit to line 113 to the control box 114. In the following example of the operation of the machine, the drill spindle 108 is being used to drill holes in the workpiece 106 at the positions corresponding to the positions I to VIII on punch card 1.

The command to start to drill is given by contact element or pin 5, the command to stop movement of the drilling machine relative to the workpiece by sensing element or pin 6, and the direction of movement by sensing elements 7 and 8. Also, concentrically arranged around sensing element 6 are four motion retarding elements 9, 10, 11 and 12. When the motor for driving the apparatus is energized, sensing member 3 and punch card 1 start moving relative to each other in a direction such that sensing member 3 leaves the starting position shown in FIGURE 1 and moves to position I. Sensing member 3, during this time, travels along the path indicated by the broken line 20. Within the range of position I, motion retarding pin 10 falls through punch card hole 13 and thus makes electrical contact to slow the relative movement between the workpiece and the drilling spindle, this movement is completely stopped when shortly thereafter stop pin 6 replaces pin 10 in hole 13 as sensing member 3 moves further. At the time pin 6 falls through hole 13 of the punch card, pin 5 also falls into punch card hole 14, whereby the drilling spindle is started by means of a motor and the workpiece drilled. After this drilling, the drilling spindle is automatically retracted and stopped, and the motor automatically begins relative movement between sensing member 3 and punch card 1, as well as corresponding movement between the workpiece and the drilling spindle, this movement being toward and into position II. At that position, movement retarding pin 10 falls first through hole 15 of the punch card and is substantially immediately replaced by the following movement of stop pin 6. When the relative movement is thus stopped, the sensing element pin 5 falls through hole 16 and the workpiece is drilled at position II in the same manner as it was drilled in position I.

At the same time, in position II, the direction pin 8 falls through punch card hole 17, and after the hole is drilled at position II, this causes the automatically started movement between the sensing member 3 and punch card 1, as well as between the drill spindle and workpiece in the direction toward the right in FIGURE 1. The same procedure is, in effect, repeated at position III. However, at this position, the movement retarding element 12 falls into hole 19 to start the slowing of the relative movement. After drilling is completed at this position, the relative movement is started vertically in FIGURE 1 toward position IV by reason of the direction pin 7 having made contact through punch card hole 18. As before, this same relative movement simultaneously takes place between the drill spindle and the workpiece.

The remaining work cycles similarly take place at punch card positions IV to VIII, with the exception that the absence of a directional hole point at position I means that the sensing member 3 will move vertically, and the absence of a drilling point hole at position VIa causes a change in the direction of relative movement without the workpiece having been drilled. It follows that the presence of a directional point hole, together with the presence of a drilling point hole, causes the drilling of the workpiece followed by a corresponding change in the direction of the relative movement between the members.

This arrangement of the control point holes in the punch card 1 and the sensing element pins in the sensing member 3 avoids that duplicate commands are given at the respective drilling positions, even though the impulse sensing member 3 and the punch card 1 can be moved relatively either to the right and left, as well as upwardly and downwardly, as shown in FIGURE 1.

Figure 2:
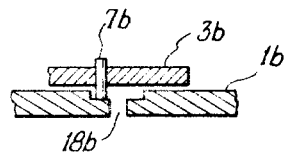
FIGURE 2 is a cross-sectional view through a modified form of the invention.

In the modification shown in FIGURE 2, the punch card 1b has a thickness such that the side walls of the holes 18b can be stepped, and accordingly, they can give a step operation to corresponding selectively displaceable sensing element pins. Thus in this modification, one pin can be used to give several machine control commands. For example, if direction pin 7b comes to rest on a step in the hole 18b of punch card 1b, a relative movement to the right is directed, and if this pin falls to the bottom of the hole, it causes a relative movement to the left. This eliminates the need of the second direction sensing element pin 8.

Instead of utilizing sensing element pins which control by contact, other sensing means, such as photoelectric impulses or magnetic impulses, are usable.

Having now described the means by which the objects of the invention are obtained.

We claim:

1. In an apparatus for guiding and controlling a machine tool in which information carrying members having control points and a sensing member are moved relative to each other in two directions and the information sensed from the information carrying member is for the purpose of delivering control commands to the machine tool, the improvement in which said sensing elements on said sensing member and the control points on said carrying member both are positioned on lines bisecting the angle between the main directions of relative movements between said carrying member and said sensing member.

2. In an apparatus as in claim 1, the improvement further comprising stepped walls forming holes in said carrying member for receiving a sensing element pin at different stepped positions in said holes.

No references cited.

WILLIAM W. DYER, JR., *Primary Examiner.*

F. S. HUSAR, *Assistant Examiner.*